Jan. 7, 1936.     E. P. FLEMING     2,026,621
ROASTING SULPHIDE ORES
Filed July 19, 1933

INVENTOR
Edward P. Fleming
BY
Austin, Dix
ATTORNEYS

Patented Jan. 7, 1936

2,026,621

UNITED STATES PATENT OFFICE 2,026,621

ROASTING SULPHIDE ORES

Edward P. Fleming, Salt Lake City, Utah, assignor to American Smelting and Refining Company, New York, N. Y., a corporation of New Jersey Application July 19, 1933, Serial No. 681,062

8 Claims. (Cl. 266—20)

This invention relates to a process and apparatus for roasting finely divided sulphide ores such as flotation concentrates and the like.

The invention provides methods and means for roasting sulphide ores by which the dust content of the exit gases is greatly diminished, a dead roast of the ore is obtained and sulphating of the calcined product is practically eliminated. Various other features and advantages of the invention are hereinafter described and set forth in the claims.

In accordance with the invention, sulphide ore and air are injected into the upper portion of a preheated roasting chamber in a manner calculated to oxidize a large part of the sulphur before the charge reaches the furnace hearth. Additional air is introduced into the lower portion to complete the roasting operation. The gas and fume are exited through a flue at a point intermediate the top and the bottom of the roasting chamber, preferably about one-half to two-thirds of the way down the shaft, and at a velocity sufficiently low to permit dust to settle from the gas and fume. The gas and fume with decreased dust content are withdrawn from the furnace and after suitable treatment the gas may be utilized as a source of sulphur dioxide in acid manufacture. The calcined ore is suitably removed from the furnace hearth.

Figure 1:
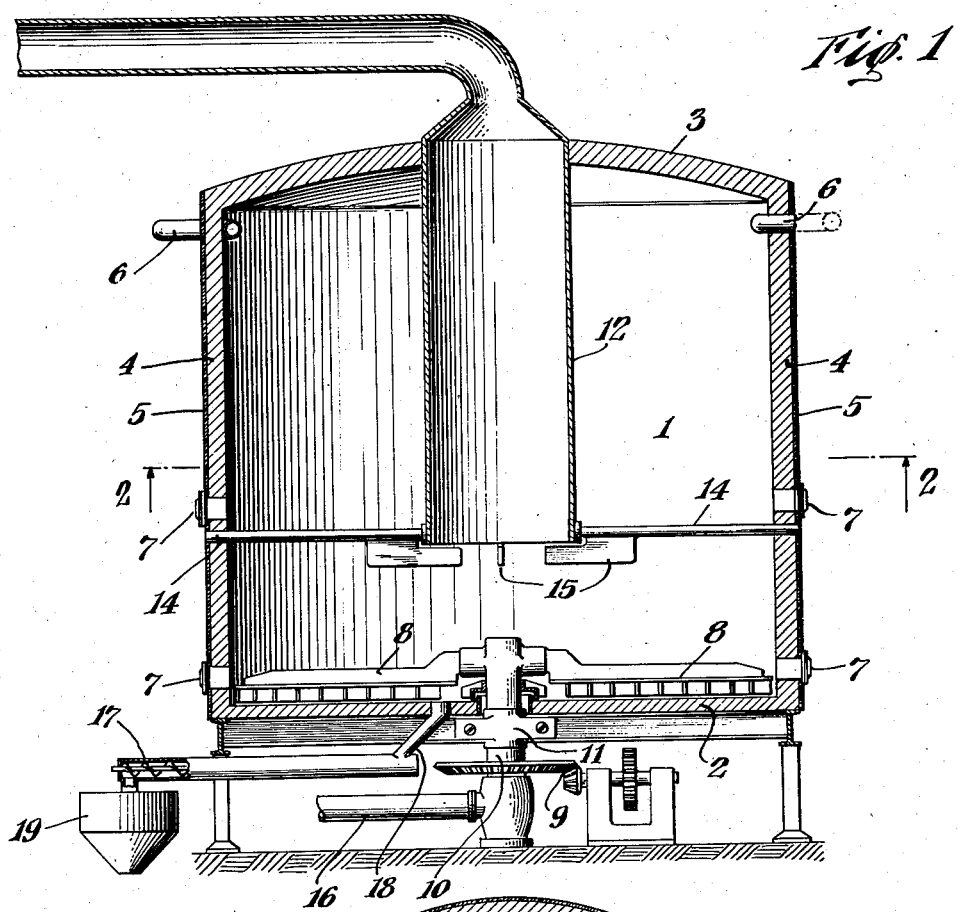
Figure 2:
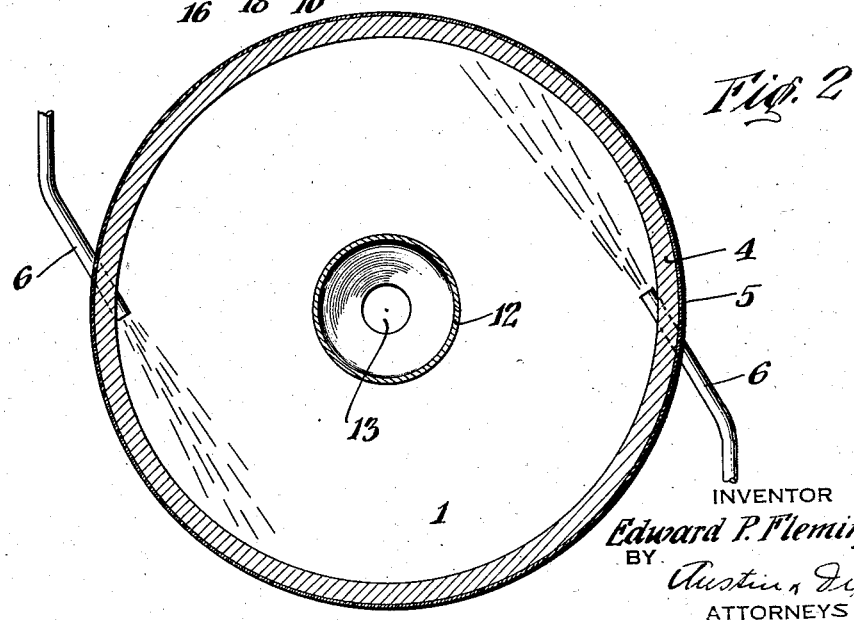

Although the novel features which are believed to be characteristic of this invention will be particularly pointed out in the claims appended hereto, the invention itself, as to its objects and advantages, and the manner in which it may be carried out, may be better understood by referring to the following description taken in connection with the accompanying drawing forming a part thereof, in which Fig. 1 is a vertical section of a roasting furnace embodying the principles of the invention; and Fig. 2 is a cross section along the line 2—2 of Fig. 1.

Like reference characters denote like parts in the several figures of the drawing.

In the following description and in the claims, various details will be identified by specific names for convenience, but they are intended to be as generic in their application as the art will permit.

Referring more in detail to the drawing, a furnace is shown in which 1 represents generally the roasting chamber enclosed by hearth 2, roof 3 and refractory side walls 4, the latter being surrounded by steel jacket 5. Feed inlets 6 and work doors 7 are provided in walls 4. Air-cooled rabble arms 8 connected with gears 9 by hollow drive shaft 10 enclosed by housing 11 are provided. A central vertical flue 12 extends downwardly through the roof into the lower region of the roasting chamber, the flue being supported by braces 14 to which are attached vanes 15. An air pipe 16 is fitted to hollow drive shaft 10. Screw conveyor 17 connects discharge outlet 18 with calcine hopper 19.

In roasting sulphide ores, as, for example, finely divided zinc concentrates, the invention may be practiced as follows: The furnace chamber is preheated to a temperature of approximately 1000° C. by means of oil burners set in the work doors. The burners are then removed, the doors closed and the concentrates together with, say, two-thirds of the air necessary for complete oxidation tangentially injected into the upper region of the furnace through feed inlets 6. After entering the roasting chamber, the tangentially injected ore and air move concurrently along a spiral course toward the hearth of the furnace, during which time a large portion of the sulphur content is oxidized to sulphur dioxide and impurities such as lead and cadmium are volatilized. During the downward course, the heavier particles tend to travel along the perimeter of the chamber leaving the lighter particles and gases in the central regions thereof.

Air is introduced through pipe 16 and after passing through hollow drive shaft 10 is utilized for cooling rabble arms 8 from which it is released into the lower portion of the roasting chamber. This preheated air meets the descending ore and forms what may be termed a countercurrent roasting zone as contrasted to the concurrent roasting zone in the upper regions of the roasting chamber. By the time the ore reaches the lower or countercurrent region of the roasting chamber practically all of the lead and the bulk of the cadmium will have been volatilized and a major portion of the sulphur oxidized to sulphur dioxide. The introduction of the preheated air along the hearth of the furnace, thus yielding an atmosphere relatively low in sulphur dioxide, together with the lowering of the high temperature zone which is accomplished by withdrawing the gases at a central point in the lower portion of the furnace, results in the ore being dead roasted. The rabble arms work the calcines toward the centre of the hearth where same are discharged through outlet 18.

The gas and fume, rich in sulphur dioxide and volatile impurities, such as lead and cadmium, are withdrawn from the furnace through the vertical flue 12 at a velocity sufficiently low to allow the relatively heavier dust particles to settle. Vanes 15 are provided to break up the swirling motion of the gases and bring same to a more quiescent state as they enter the flue, thus facilitating the removal of dust particles by gravity. The flue 12 may be constructed of one of the chromium steel alloys containing from 25% to 30% of chromium. Alloys of this general composition may be readily fabricated and will resist temperature oxidation up to approximately 1150% C. If desired, the flue 12 may be provided with an air jacket to further protect it from deterioration. The fume and other solid material may be separated from the gases withdrawn through the flue 12 by passing same through a cyclone separator and Cottrell or bag installation to yield a high sulphur dioxide gas suitable for acid manufacture.

It will be readily apparent to those skilled in the art that the present invention possesses many advantages and yields new and improved results. For example, it is possible by the present invention to accomplish a complete dead roast of the sulphide ore and thus insure a practically 100% recovery of the sulphur as sulphur dioxide. Instead of withdrawing the gases and fume from either the top or the bottom of the furnace, as has been previously proposed, same are withdrawn from a point intermediate the top and the bottom, which is preferably one-half to two-thirds of the way down the shaft and near the center thereof, thus lowering the high temperature zone of the furnace and insuring a sufficiently high temperature to effect a dead roast of the ore particles. Again, the introduction of air in the vicinity of the hearth insures a final roasting zone in which the sulphur dioxide concentration is at a minimum. As the calcined particles are maintained in this atmosphere of low sulphur dioxide concentration from the time they reach the bottom of the furnace until they are completely roasted and discharged from the hearth, sulphating of the calcines is practically eliminated. By reason of the efficient elimination of sulphur, the gases withdrawn are high in sulphur dioxide, often analyzing 8% or more of that constituent. In addition, it has been found that in treating zinc concentrates practically all of the lead and a major portion of the cadmium content contained therein are volatilized (probably as sulphides) and may be separated from the gas by suitable means.

A salient feature of the invention is the remarkably low dust content of the gases withdrawn from the furnace. While it is true that many of the heavier particles of dust may be thrown outwardly along the perimeter of the roasting chamber by tangentially injecting the ore, the novel manner in which the gases are withdrawn is of special importance in reducing the dust content. By providing a flue with the offtake opening into what may be termed the "neutral" zone between the downdraft and up-draft zones, as previously described, and regulating the draft in same to insure a velocity sufficiently low to allow a large portion of the dust particles to settle, a marked decrease in the dust content of the gases is obtained.

While no claim is made to the tangential injection of the ore per se, it is highly desirable to inject the ore in this manner as it allows the use of a furnace having a much shorter shaft than when the ore is simply introduced at the top of the shaft and allowed to fall downwardly therethrough. Also the centrifugal action set up by the tangential action of the ore tends to throw the dust particles away from the offtake flue.

While certain novel features of the invention have been disclosed and are pointed out in the annexed claims it will be understood that various omissions substitutions and changes may be made by those skilled in the art without departing from the spirit of the invention.

What is claimed is:

1. The process of roasting sulphide ore in suspension which comprises tangentially introducing air and said ore into the upper portion of a preheated roasting chamber thereby establishing a concurrent roasting zone, establishing a countercurrent roasting zone by introducing additional air into the lower portion of said chamber in countercurrent flow to the descending ore particles thereby establishing a neutral zone at the interface of said concurrent and countercurrent zones and withdrawing the resultant gases from said neutral zone.

2. The process of roasting finely divided sulphide ore in suspension which comprises establishing a down-draft roasting zone in the upper portion of a preheated roasting chamber, introducing said ore and sufficient air to partially oxidize same into said down-draft zone, establishing an up-draft roasting zone in the lower portion of said chamber, introducing additional air into said up-draft zone in sufficient quantities to complete the oxidation of said ore and withdrawing the resultant gases from said down-draft and up-draft roasting zones at a point intermediate, and substantially distant from, the hearth and roof respectively of said roasting chamber.

3. The process of roasting finely divided zinc sulphide ore in suspension which comprises introducing said ore with sufficient air to partially oxidize same into the upper portion of a preheated roasting chamber, introducing additional air into the lower portion of said chamber in quantities sufficient to complete the oxidation of said ore and withdrawing the resultant gases from the central portion of said chamber at a point intermediate the top and bottom of the roasting chamber.

4. The process of roasting finely divided sulphide ore which comprises tangentially injecting said ore with sufficient air to partially oxidize same into the upper portion of a preheated roasting chamber, introducing additional air into the lower portion of said chamber in quantities sufficient to complete the oxidation of said ore and withdrawing the resultant gases from the central portion of said chamber at a point intermediate the top and bottom of the roasting chamber.

5. The method of roasting finely divided zinc sulphide ore which comprises tangentially introducing said ore with sufficient air to initiate the roasting operation into the upper portion of a preheated roasting chamber, introducing additional air sufficient to complete the roasting operation into the lower portion of said chamber and withdrawing the resultant gases through a central flue at a point approximately one-half to two-thirds down the shaft of the furnace at a velocity sufficiently low that dust particles are separated from the gases by gravitation.

6. In roasting finely divided sulphide ores in suspension without aid of extraneous fuel by introducing such ores into the upper portion of a preheated roasting chamber, the improvement which consists in withdrawing the fume from the furnace through a vertical interior flue at a point intermediate the top and the bottom of the roasting chamber and at a velocity sufficiently low that dust particles separate from the fume by gravitation.

7. In an apparatus for roasting sulphide ores, the combination comprising a roasting chamber, means for tangentially injecting ore into the upper portion of said chamber, rabbling means positioned above the hearth of said chamber and a vertical offtake flue extending from the roof of said chamber to a point more than half-way down said chamber.

8. In combination with a roasting chamber for oxidizing finely divided zinc sulphide ore, means for injecting ore into the upper portion of said chamber, a central offtake flue within said roasting chamber, said flue having an opening intermediate the top and the bottom of said chamber and adapted to remove gases from said chamber at a velocity sufficiently low to permit dust particles to separate by gravity from gases passing upwardly through said flue.

EDWARD P. FLEMING.